(12) United States Patent
Pozzi et al.

(10) Patent No.: US 11,181,648 B2
(45) Date of Patent: Nov. 23, 2021

(54) SCINTILLATOR-BASED NEUTRON AND GAMMA-RAY DOSIMETER

(71) Applicant: THE REGENTS OF THE UNIVERSITY OF MICHIGAN, Ann Arbor, MI (US)

(72) Inventors: Sara Pozzi, Ann Arbor, MI (US); Shaun Clarke, Duns (GB); Marek Flaska, Spring Mills, PA (US); Angela Di Fulvio, Champaign, IL (US)

(73) Assignee: THE REGENTS OF THE UNIVERSITY OF MICHIGAN, Ann Arbor, MI (US)

( * ) Notice: Subject to any disclaimer, the term of this patent is extended or adjusted under 35 U.S.C. 154(b) by 0 days.

(21) Appl. No.: 16/776,656

(22) Filed: Jan. 30, 2020

(65) Prior Publication Data

US 2020/0166655 A1  May 28, 2020

Related U.S. Application Data

(63) Continuation-in-part of application No. 15/529,526, filed as application No. PCT/US2015/065558 on Dec. 14, 2015, now abandoned.
(Continued)

(51) Int. Cl.
  *G01T 1/20* (2006.01)
  *G01T 1/02* (2006.01)
  (Continued)

(52) U.S. Cl.
  CPC ............. *G01T 1/20* (2013.01); *G01T 1/023* (2013.01); *G01T 3/06* (2013.01); *G06F 17/18* (2013.01)

(58) Field of Classification Search
  None
  See application file for complete search history.

(56) References Cited

U.S. PATENT DOCUMENTS

| 5,256,879 A | * 10/1993 | McNulty | ............... G01T 1/247 |
| | | | 250/370.06 |
| 7,456,405 B1 | 11/2008 | Iwatschenko-Borho et al. | |
| | | (Continued) | |

FOREIGN PATENT DOCUMENTS

WO  2012060873 A1  5/2012

OTHER PUBLICATIONS

Yamazaki et al., "Neutron-gamma discrimination based on pulse shape discrimination in aCe:LiCaAlF6 scintillator" Nuclear Instruments and Methods in Physics Research A652 (2011) 435-438 (Year: 2011).*
(Continued)

*Primary Examiner* — John C Kuan
(74) *Attorney, Agent, or Firm* — Harness, Dickey & Pierce, P.L.C.

(57) ABSTRACT

A method for obtaining fast neutron and gamma ray quantities in an unknown neutron and gamma ray mixed field. The method is comprised of (1) a radiation detector capable of measuring neutrons and gamma rays, (2) identification of the neutron and the gamma ray interactions based on digital pulse shape analysis, (3) formation of a pulse height (or pulse area) histogram for both neutron and gamma ray events, (4) conversion of the neutron and gamma ray pulse height (or pulse area) histogram into a quantity of interest such as count rate, energy spectra, kerma, absorbed dose, and dose equivalent, for both instantaneous and integral readings, and (5) steps (2-4) occurring in real-time.

21 Claims, 4 Drawing Sheets

Related U.S. Application Data

(60) Provisional application No. 62/091,774, filed on Dec. 15, 2014.

(51) Int. Cl.
 *G01T 3/06* (2006.01)
 *G06F 17/18* (2006.01)

(56) References Cited

U.S. PATENT DOCUMENTS

| | | | |
|---|---|---|---|
| 2007/0290136 A1* | 12/2007 | Ivan | G01T 3/06 250/361 R |
| 2009/0057562 A1* | 3/2009 | Heijne | G01T 1/026 250/370.07 |
| 2011/0031413 A1 | 2/2011 | Akselrod et al. | |
| 2012/0080598 A1 | 4/2012 | Aspinall et al. | |
| 2014/0151567 A1 | 6/2014 | Slaughter et al. | |

OTHER PUBLICATIONS

Whitney et al., "DPA-Based Fast Neutron Dosimeter for the Space Environment" IEEE Transactions on Nuclear Science, vol. 60, No. 2, Apr. 2013 (Year: 2013).*

International Search Report and Written Opinion for PCT/US2015/065558, dated Oct. 4, 2016; ISA/KR.

Wang et al., "The Research on Neutron Dose Equivalent Meter for Pulse Neutron Radiation Field" 2008 IEEE Nuclear Science Symposium Conference Record, N30-252, 2008 (Year: 2008).

Aryaeinejad et al., "Development of a Hand held Device for Simultaneous Monitoring of Fast Neutrons and Gamma Rays" IEEE Transactions on Nuclear Science, vol. 49, No. 4, Aug. 2002 (Year: 2002).

* cited by examiner

SCINTILLATOR-BASED NEUTRON AND GAMMA-RAY DOSIMETER

CROSS-REFERENCE TO RELATED APPLICATIONS

This application is a continuation-in-part of U.S. patent application Ser. No. 15/529,526 filed on May 25, 2017, which is a U.S. National Phase Application under 35 U.S.C. 371 of International Application No. PCT/US2015/065558 filed on Dec. 14, 2015. International Application No. PCT/US2015/065558 is based on and claims the benefit of U.S. Provisional Application No. 62/091,774, filed on Dec. 15, 2014. The entire disclosures of the above applications are incorporated herein by reference.

GOVERNMENT INTEREST

This invention was made with government support under 2010-DN-077-ARI039-02, awarded by the Department of Homeland Security/ST. The Government has certain rights in the invention.

FIELD

The present disclosure relates to a method for obtaining real-time fast neutron and gamma ray dosimetric quantities such as count rate, energy spectrum, kerma, absorbed dose, and dose equivalent, in an unknown neutron and gamma ray field.

BACKGROUND AND SUMMARY

This section provides background information related to the present disclosure which is not necessarily prior art. This section provides a general summary of the disclosure, and is not a comprehensive disclosure of its full scope or all of its features.

Many current neutron dosimeters rely on the use of detectors sensitive to thermal neutrons, which may require bulky moderator materials such as polyethylene to become sensitive to fast neutrons. Neutron fields exist in conjunction with gamma ray fields, the gamma rays being emitted by the neutron source itself or by neutron interaction with materials in the environment. Current dosimetry approaches require the use of a separate detector that is sensitive to gamma rays. Personnel dosimetry based on thermo-luminescent detectors are non-realtime, integrating devices. Facilities such as hospitals, nuclear reactors, facilities where radioactive materials and special nuclear materials are handled, and universities and laboratories where radiation sources are stored and used are in need of new dosimetry methods.

It would be very useful to have a single device whereby the dosimetric quantities such as count rate, energy spectrum, kerma, absorbed dose, and dose equivalent are monitored in real-time, providing both instantaneous and integral readings, separately for fast neutrons and gamma rays. Fast neutrons (neutrons having energy above approximately one hundred kilo electron volts) are much more damaging than lower energy neutrons to humans. The present teachings specialize in the detection and dosimetry of fast neutrons and gamma rays.

According to the principles of the present teachings, a dosimetry method is provided based on organic scintillation detectors, which are sensitive to both neutrons and gamma rays. The voltage pulse measured from these detectors can be directly related to the energy deposited without the need of bulky moderating material. This increased spectroscopic fidelity will result in a more accurate determination of the deposited dose. The organic composition of the scintillation material is a reasonable approximation for tissue, which alleviates the need for approximate flux-to-dose conversion factors: the energy deposited in the detector can be used to directly calculate the absorbed dose.

The present teachings provide several benefits over conventional systems, such as but not limited to providing neutron and gamma ray dosimeter in a single instrument; lightweight construction that can be used as a handheld device; and, for neutrons, providing improved energy-dependent dose calculation.

Conventional non-personnel neutron dosimeters are based on thermal-neutron detection in moderated gaseous detection media such as $^3$He. These dosimeters are bulky, only respond to neutrons, and provide only average, loosely energy-dependent dose information based on the associated neutron moderating material. Personnel dosimetry based on thermo-luminescent detectors are non-realtime, integrating devices.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Figure 1:
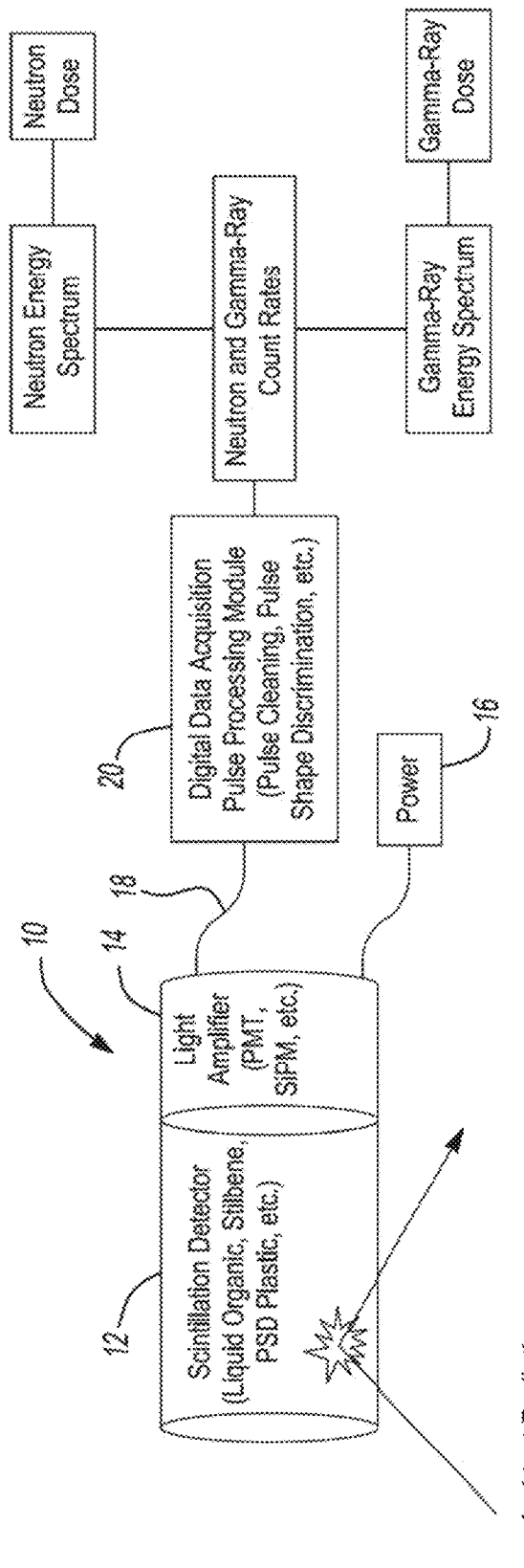
FIG. 1 shows a schematic diagram of the measurement setup of the present invention.

Table 1 shows the measurement results from the application of the present invention ("stilbene") for common gamma-ray sources compared to existing instruments "Ion Chamber") and to Monte Carlo simulations ("MCNPX").

Table 2 shows the measurement results from the application of the present invention ("stilbene") for a neutron source compared to existing instruments ("Remball") and to Monte Carlo simulations ("MCNPX"). Readings from two separate instruments, one for neutrons, and one for gamma rays, must be compared to the readings provided by the instrument of the present invention.

Corresponding reference numerals indicate corresponding parts throughout the several views of the drawings.

DETAILED DESCRIPTION

Example embodiments will now be described more fully with reference to the accompanying drawings. Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

According to the principles of the present teachings, a method is provided for obtaining fast neutron and gamma ray count rate, energy spectrum, kerma, absorbed dose, and dose equivalent (separately and combined) in an unknown neutron and gamma ray mixed field by use of a single detector. In some embodiments, the method comprises of the following steps: (1) providing a radiation detector capable of measuring both fast neutrons and gamma rays; (2) identifying neutron and gamma ray interactions based on pulse shape analysis; (3) forming a pulse height (or pulse area) histogram for both neutron and gamma ray events; (4) converting the neutron and gamma ray pulse height (or pulse area) histogram into a quantity of interest, such as count rate, energy spectra, kerma, absorbed dose, and dose equivalent, both instantaneous and integral; and, in some embodiments, (5) steps (2-4) occurring in real-time.

Figure 2:
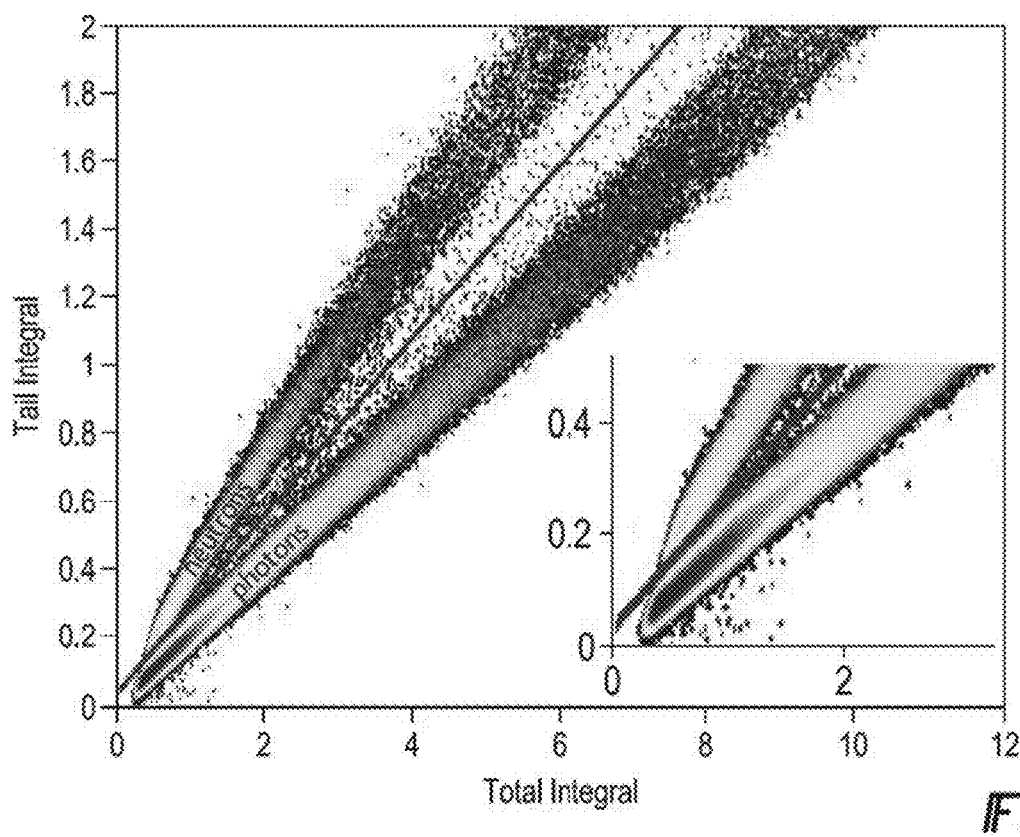
FIG. 2 shows a typical pulse shape discrimination plot separating out neutron events and gamma ray events by using a digital charge integration algorithm.

In some embodiments, the radiation detector 10 of step (1) is an organic scintillation detector 12 capable of measuring both fast neutrons and gamma rays. The light produced by the scintillation detector 12 is collected and amplified by a photomultiplier tube or silicon photomultiplier 14, which receives input power at 16 and outputs a voltage pulse at 18. In some embodiments, the voltage pulse digitized from these photo-detectors is analyzed at 20 to classify events as neutron or gamma ray (See FIG. 2).

The present invention teaches the steps that are necessary to treat the raw experimental data to obtain the quantities of interest from the detection system. The steps are necessary to (a) account for electronic baseline correction, (b) remove the pulse data of clipped or double-pulses, and (c) classify the pulse data as neutron or gamma ray. The steps are described in detail below.

Figure 3:
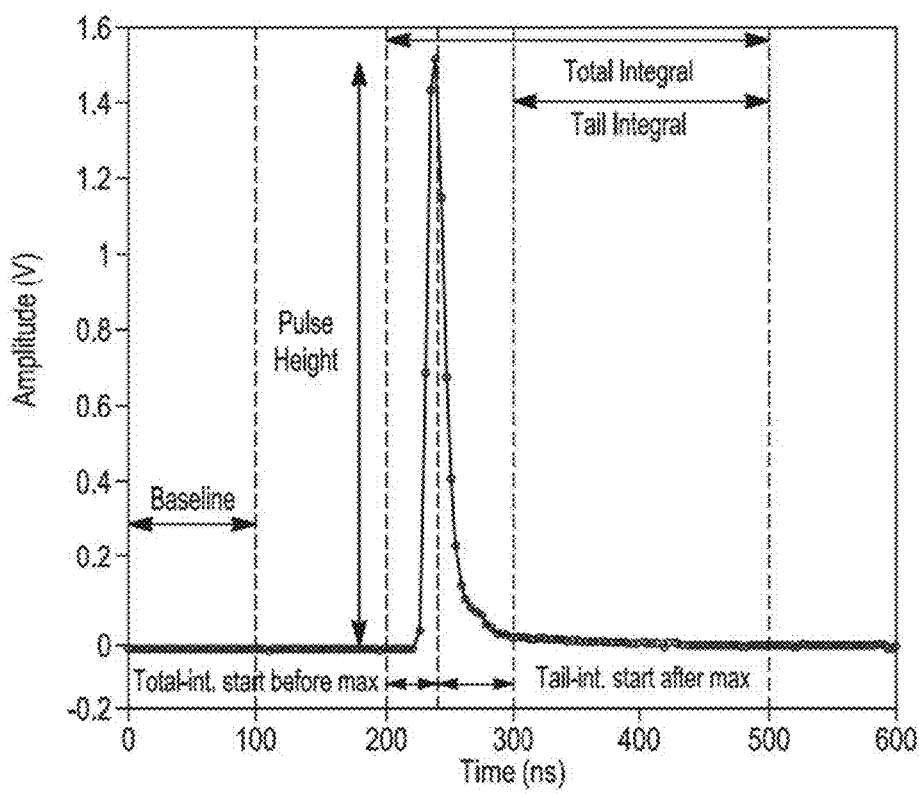
FIG. 3 shows a typical digitized pulse.

Step (a): the baseline value for each digitized pulse is calculated as the average of the digitized samples prior to the pulse rising edge; the starting sample and the number of samples used to compute this average is optimized for each detector. FIG. 3 shows an example of the region used to calculate the baseline average on a digitized pulsed. In some embodiments, this process occurs in real time. In some embodiments, this process occurs via a computer-implemented method.

Figure 4:
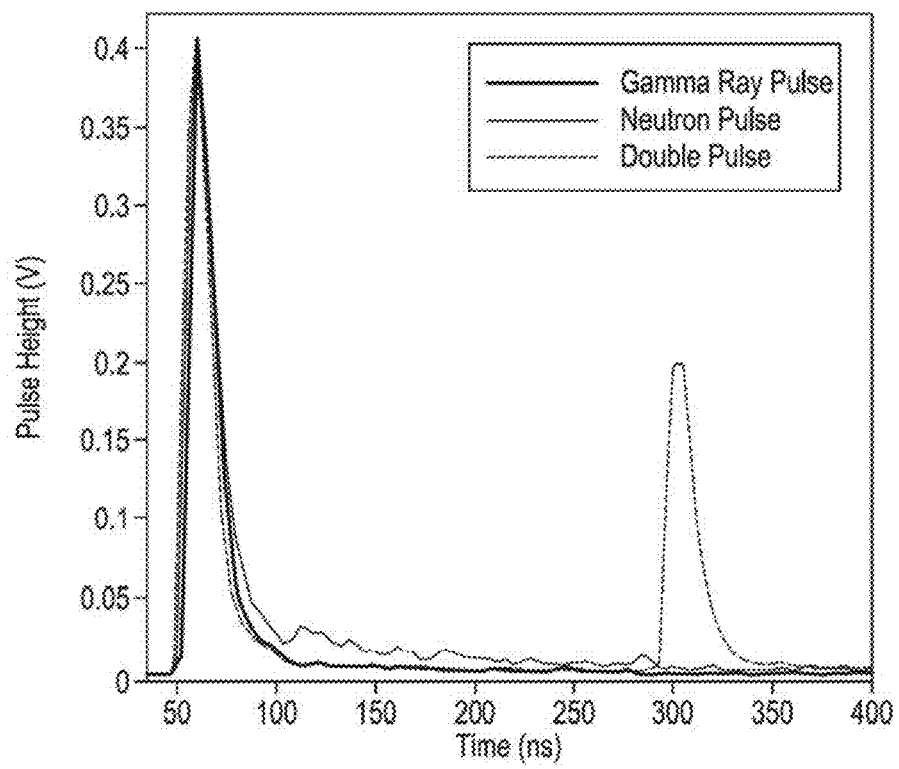
FIG. 4 shows a typical double pulse (compared to regular neutron or photon pulses).
Figure 5:
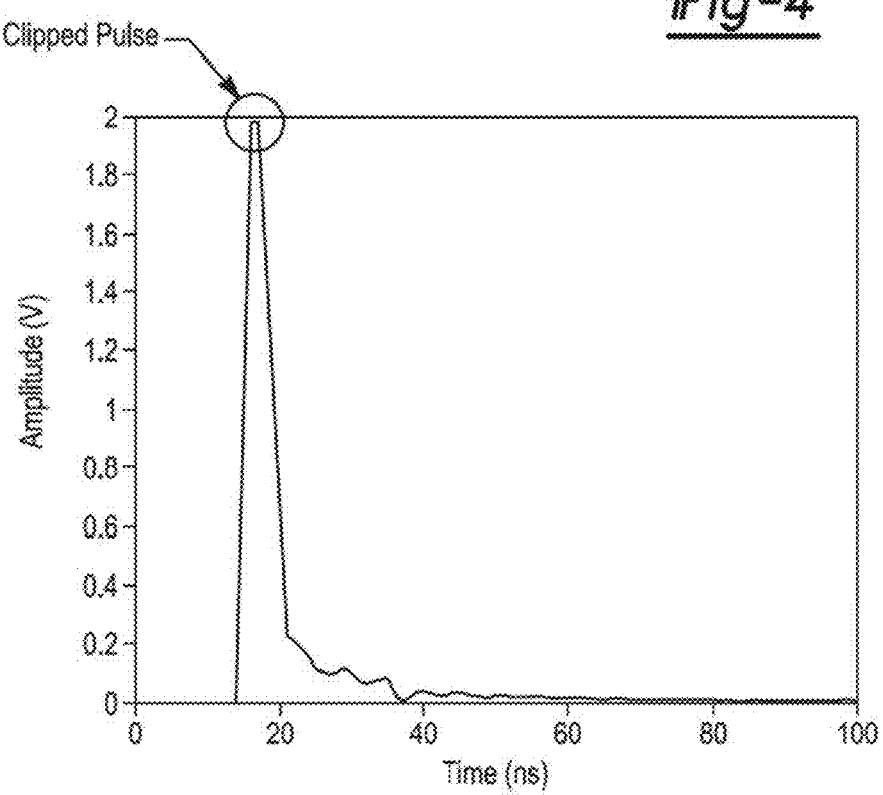
FIG. 5 shows a typical clipped pulse.

Step (b): FIG. 4 shows an example of a "double pulse". One method for removing double pulses uses the difference in the voltage readings at two or more samples to determine the presence of a double pulse and subsequently removes it. Another method for removing double pulses compares each pulse to pre-calculated pulse templates for the detector; pulses that do not follow the template are removed. FIG. 5 shows an example of a "clipped pulse". One method for removing clipped pulses compares the pulse maximum to an optimized threshold that depends on the digitizer and the baseline; pulses that exceed this threshold are removed.

Step (c): One method for performing pulse shape discrimination computes the integrals of each digitized pulse in two optimized regions: the "tail" region and the "total" region. The value of these two integrals is compared to a pre-determined, optimized discrimination curve. For a given digitized pulse, this curve is evaluated at the pulse's total integral; if the pulse tail integral is greater than the evaluated curve, the pulse is classified as a neutron, otherwise it is classified as a photon (see FIG. 2). In another method, digitized pulses are compared to pre-calculated pulse templates for neutrons and photons; classification is determined by which template better matches the digitized pulse.

Figure 6:
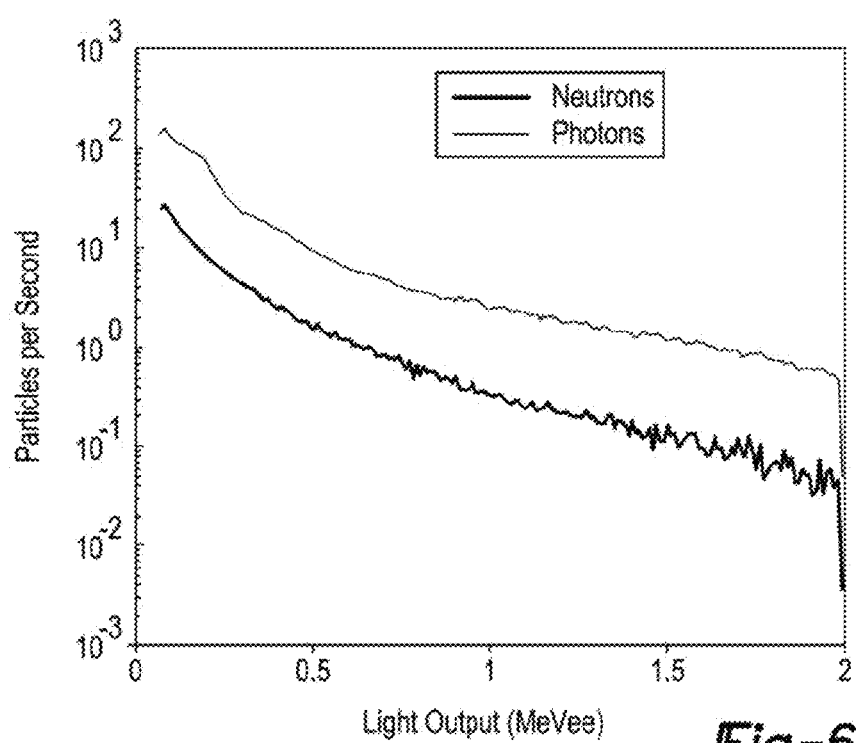
FIG. 6 shows a typical pulse height histogram distribution for both neutron and gamma ray events measured from a Cf-252 source.

In some embodiments, following pulse shape discrimination, the measured pulse height or pulse area is used to create a pulse height or pulse area histogram, separately for neutrons and for gamma rays (See FIG. 6). For both types of particles, the pulse histogram is directly related to the energy deposited.

For gamma rays, there is a linear dependence on the pulse histogram and the energy deposited. The present invention teaches how the pulse histogram for fast neutrons is non-linearly related to neutron energy deposited. The recorded neutron pulse histogram is converted into energy deposited by use of mathematical functions, or sets of parameters, including scintillator light output functions, or other means, into a quantity of interest such as energy spectra, kerma, absorbed dose, and dose equivalent.

In some embodiments, the calculation of dose equivalent can be based on absorbed dose, which requires the determination of energy deposited. Energy deposited is measured as scintillation light output. For gamma rays, light output is linearly related to energy deposition: the inverse of this relationship is applied to calculate energy deposition from the measured light output. For neutrons, light output is non-linearly related to energy deposition: the inverse of this relationship is applied to the recorded light output spectrum, assuming that all neutron pulses result from a single scatter on hydrogen (protons).

In some embodiments, the present invention evaluates absorbed dose for neutrons and gamma rays by normalizing to the energy deposited by each particle by the detector mass.

In some embodiments, the present invention evaluates neutron and gamma ray dose equivalent by multiplying the absorbed dose by the appropriate radiation weighting factors. For neutrons, these factors are known as a function of proton recoil energy (linear energy transfer). For gamma rays these factors are equal to one. This invention teaches how to evaluate the dose equivalent on an event-by-event basis for neutrons and gamma rays.

According to some embodiments of the present invention, the recorded pulse histogram is compared to a database of pulse histograms from known neutron and gamma ray fields via a computer-implemented method.

Table 1 shows the measurement results from the application of the present invention ("stilbene") for common gamma-ray sources compared to existing instruments ("ion chamber") and to Monte Carlo simulations (MCNPX). These results demonstrate the present invention is able to accurately measure the photon dose rate over a range of photon energies with a variety of lead shielding present.

TABLE 1

Photon dose rates from 137 Cs, 22 Na, and 60 Co sources

| | Photon Equivalent Dose Rate (µSv/hr) | | |
|---|---|---|---|
| Source at 30 cm | Stilbene | MCNPX | Ion Chamber |
| photon sources, bare | 13.3 ± 0.6 | 13.8 ± 0.7 | 13.4 ± 1.5 |
| photon sources, 0.64 cm lead shielded | 9.1 ± 0.4 | 9.4 ± 0.5 | 8.6 ± 0.9 |
| photon sources, 1.27 cm lead shielded | 6.1 ± 0.3 | 6.3 ± 0.3 | 5.6 ± 0.6 |
| Photon sources, 2.54 cm lead shielded | 2.8 ± 0.1 | 2.9 ± 0.1 | 2.8 ± 0.3 |

Readings from two separate instruments—one for neutrons and one for gamma rays—must be compared to the readings provided by the instrument of the present invention. Table 2 shows the neutron dose measurement from the application of the present invention ("stilbene") compared to existing instruments ("Remball") and to Monte Carlo simulations ("MCNPX"). These results demonstrate the present invention is able to accurately measure the neutron dose rate with a variety of polyethylene shielding present that changes the incident neutron energy spectrum.

TABLE 2

Measured and simulated 252 Cf neutron dose rates with incremental polyethylene moderation. Both the stilbene dosimeter and RemBall have been calibrated to the 252 Cf neutron spectrum.

| | Neutron Equivalent Dose Rate (µSv/hr) | | |
|---|---|---|---|
| Source at 50 cm | Stilbene | RemBall | MCNPX |
| Unmoderated | 276.8 ± 10.4 | 300 ± 33 | 276.8 ± 13.8 |
| 2.54 cm polyethylene | 206.7 ± 7.9 | 260 ± 29 | 232.1 ± 11.6 |
| 5.08 cm polyethylene | 140.7 ± 5.5 | 210 ± 23 | 170.4 ± 8.5 |
| 7.62 cm polyethylene | 94.3 ± 3.8 | 130 ± 14 | 118.2 ± 5.9 |
| 10.16 cm polyethylene | 63.6 ± 2.7 | 90 ± 10 | 80.2 ± 4.0 |
| 12.7 cm polyethylene | 44.2 ± 1.9 | 65 ± 7 | 54.6 ± 2.7 |
| 15.24 cm polyethylene | 31.9 ± 1.3 | 50 ± 6 | 37.9 ± 1.9 |

It should be understood that scintillator type can be varied, such as but not limited to stilbene, liquid scintillator, PSD-capable plastic. Readout can be based on photomultiplier tube or SiPM using analog or digital methods and software can be modified as needed.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method for obtaining neutron and gamma ray quantities in an unknown neutron and gamma ray field, comprising:
    (1) providing a radiation detector capable of measuring both neutrons and gamma rays;
    (2) identifying neutron and gamma ray events based on pulse shape analysis of an output from the radiation detector;
    (3) forming a pulse height or pulse area histogram for the identified neutron and gamma ray events; and
    (4) converting the gamma ray pulse height or pulse area histogram into a quantity of interest, the quantity of interest comprising a dose equivalent and calculating the dose equivalent based on absorbed dose and energy deposition, the energy deposition being measured as scintillation light output, wherein the scintillation light output for gamma rays is linearly related to the energy deposition and an inverse thereof is applied to calculate energy deposition from the scintillation light output.

2. The method according to claim 1 comprising calculating the absorbed dose for neutrons and gamma rays by normalizing the calculated energy deposition to a mass of the radiation detector, the calculated absorbed dose is then used to determine the dose equivalent.

3. The method according to claim 1 wherein steps 2-4 occur in real-time.

4. The method according to claim 1 whereby the quantity of interest comprises an instantaneous gamma ray count.

5. The method according to claim 1 whereby the quantity of interest comprises an integral gamma ray count.

6. The method according to claim 1 wherein the radiation detector is handheld.

7. The method according to claim 1 wherein the radiation detector is a fixed-installation for facility monitoring.

8. The method according to claim 1 wherein the radiation detector is a scintillator sensitive to both neutron and gamma rays.

9. The method according to claim 1 wherein the radiation detector comprises a detection medium, the detection medium being a scintillator sensitive to gamma rays only.

10. The method according to claim 1 wherein at least one of the steps 2-4 is implemented via a computer.

11. The method according to claim 10 wherein the computer executes programming stored on a non-transitory computer-readable medium.

12. A method for obtaining neutron and gamma ray quantities in an unknown neutron and gamma ray field, comprising:
    (1) providing a radiation detector capable of measuring both neutrons and gamma rays;
    (2) identifying neutron and gamma ray events based on pulse shape analysis of an output from the radiation detector;
    (3) forming a pulse height or pulse area histogram for the identified neutron and gamma ray events; and
    (4) converting the neutron pulse height or pulse area histogram into a quantity of interest, the quantity of interest comprising a dose equivalent and calculating the dose equivalent based on absorbed dose and energy deposition, the energy deposition being measured as scintillation light output, wherein the scintillation light output for neutrons is non-linearly related to the energy deposition and an inverse thereof is applied to a recorded light output spectrum by assuming that all neutron pulses result from a single scatter on hydrogen.

13. The method according to claim 12 whereby the quantity of interest comprises an instantaneous neutron ray count.

14. The method according to claim 12 whereby the quantity of interest comprises an integral neutron ray count.

15. The method according to claim 12 wherein the radiation detector comprises a detection medium, the detection medium being a scintillator sensitive to neutrons only.

16. The method according to claim 12 wherein at least one of the steps 2-4 is implemented via a computer.

17. The method according to claim 16 wherein the computer executes programming stored on a non-transitory computer-readable medium.

18. The method according to claim 12 wherein steps 2-4 occur in real-time.

19. The method according to claim 12 wherein the radiation detector is handheld.

20. The method according to claim 12 wherein the radiation detector is a fixed-installation for facility monitoring.

21. The method according to claim 12 wherein the radiation detector is a scintillator sensitive to both neutron and gamma rays.

\* \* \* \* \*